United States Patent [19]

Miyawaki

[11] Patent Number: 4,760,760
[45] Date of Patent: Aug. 2, 1988

[54] CONTROL SYSTEM FOR A CONTINUOUSLY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 907,871

[22] Filed: Sep. 16, 1986

[30] Foreign Application Priority Data

Sep. 20, 1985 [JP] Japan .................. 60-209711

[51] Int. Cl.$^4$ .................. B60K 41/16
[52] U.S. Cl. .................. 74/866; 74/868
[58] Field of Search .................. 74/866, 867, 868

[56] References Cited

U.S. PATENT DOCUMENTS

| | | | |
|---|---|---|---|
| 4,369,675 | 1/1983 | van Deursen | 74/864 |
| 4,387,608 | 6/1983 | Mohl et al. | 74/867 X |
| 4,470,117 | 9/1984 | Miki et al. | 74/866 X |
| 4,476,746 | 10/1984 | Miki et al. | 74/866 X |
| 4,509,125 | 4/1985 | Fattic et al. | 74/866 X |
| 4,565,110 | 1/1986 | Ito | 74/867 X |
| 4,580,465 | 4/1986 | Omitsu | 74/866 |
| 4,589,302 | 5/1986 | Oda et al. | 74/866 |
| 4,590,561 | 5/1986 | Abo et al. | 74/866 X |
| 4,612,827 | 9/1986 | Omitsu | 74/866 |
| 4,628,773 | 12/1986 | Itoh et al. | 74/867 |
| 4,663,991 | 5/1987 | Nakamura et al. | 74/868 |

Primary Examiner—Leslie A. Braun
Assistant Examiner—Dwight G. Diehl
Attorney, Agent, or Firm—Martin A. Farber

[57] ABSTRACT

A control system for a motor vehicle provided with a continuously variable transmission which has a transmission ratio control valve having a spool for controlling the transmission ratio. During the deceleration of the vehicle by closing a throttle valve of the engine, the transmission ratio is upshifted when engine speed does not greatly fluctuate, so that engine speed is reduced further.

18 Claims, 7 Drawing Sheets

CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the speed of an engine in accordance with driving conditions of the vehicle.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to driving wheels of the vehicle through a clutch and the transmission. The line pressure is controlled to prevent the belt from slipping on the pulleys in order to transmit the output of the engine.

When starting of the vehicle, the transmission ratio is set at a maximum value. When an accelerator pedal is depressed to increase engine speed, the speed of the vehicle increases, keeping the transmission ratio at the maximum value. A line $l_1$ of FIG. 5 shows the increases of engine and vehicle speeds. When the vehicle speed and engine speed reach set values under a driving condition, the transmission ratio starts to reduce (to upshift). At that time if the engine speed is kept constant, the transmission ratio is automatically and continuously reduced at a changing speed.

When the accelerator pedal is released, engine speed and vehicle speed reduce at a constant transmission ratio along a line, for example line $l_2$ of FIG. 5. At that time, although the throttle valve of the engine is at an idle position, the engine is driven by the driving wheels through the transmission and clutch at a speed higher than the idle speed of the engine. When the engine speed decreases to a set speed at a point A of FIG. 5, the transmission ratio begins to increase, while the engine speed is kept at the set value N. Thus, the vehicle speed reduces along a line $l_3$. The engine speed N is set to a relatively higher value in order to prevent stalling of the engine. Accordingly, the noise of the engine is loud compared with a motor vehicle having a manual transmission and fuel consumption increases.

SUMMARY OF THE INVENTION

The object of the present invention is to provide a system for controlling the transmission ratio so as to reduce noise and fuel consumption during the idling operation of an engine.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a first hydraulic circuit having a pump for supplying oil to the first hydraulic cylinder through the transmission ratio control valve. The system according to the present invention comprises first means for detecting operating conditions of the engine and for producing a first signal, second means responsive to the first signal for shifting the spool of the transmission ratio control valve so as to change the transmission ratio, third means for detecting closing of a throttle valve of the engine and for producing a closed throttle signal, fourth means for producing a fluctuation signal when fluctuation of engine speed is smaller than a predetermined value, fifth means responsive to the closed throttle signal and the fluctuation signal for producing an upshift signal, sixth means responsive to the upshift signal for effecting the second means so as to shift the spool of the transmission ratio control valve in an upshift direction to upshift the transmission ratio.

In an aspect of the present invention, the second means includes a second hydraulic circuit for supplying the oil to the transmission ratio control valve so as to shift the spool, and control valve means provided in the second hydraulic circuit for controlling the amount of the oil supplied to the transmission ratio control valve.

The other objects and features of this invention will become understood from the following description with reference to the accompanying drawings.

DETAILED DESCRIPTION OF THE PREFERRED EMBODIMENT

Figure 1:
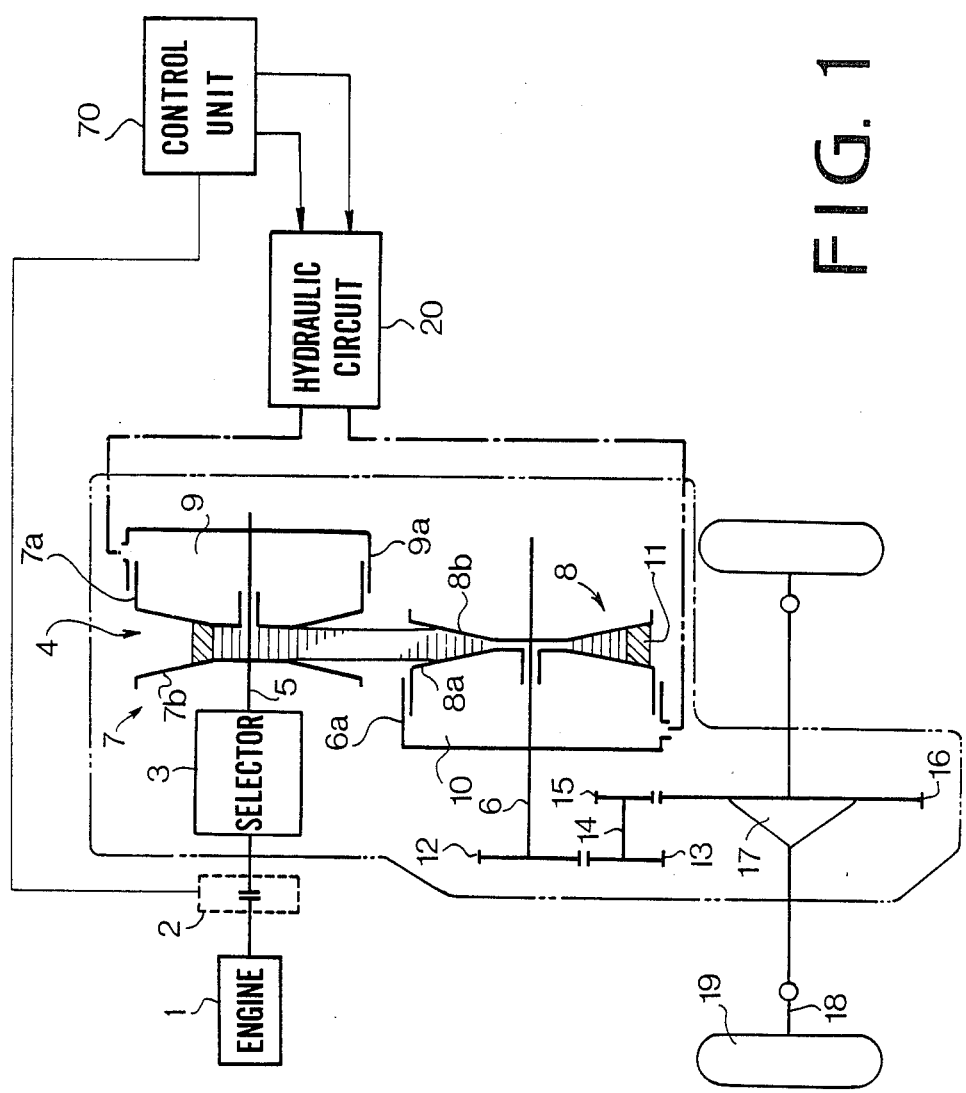
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
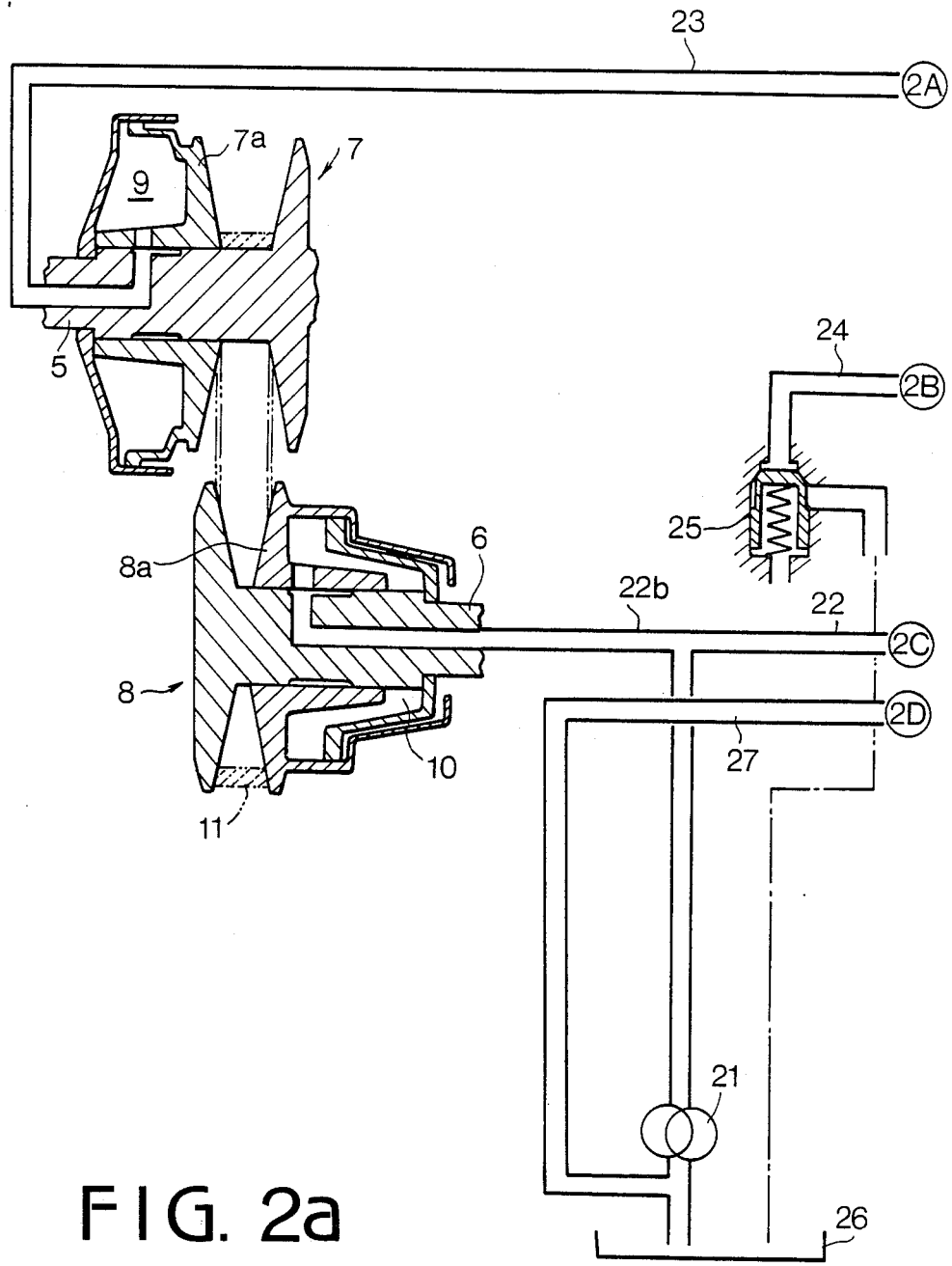
FIGS. 2a and 2b are schematic diagrams showing a control system according to the present invention.
Figure 2B:
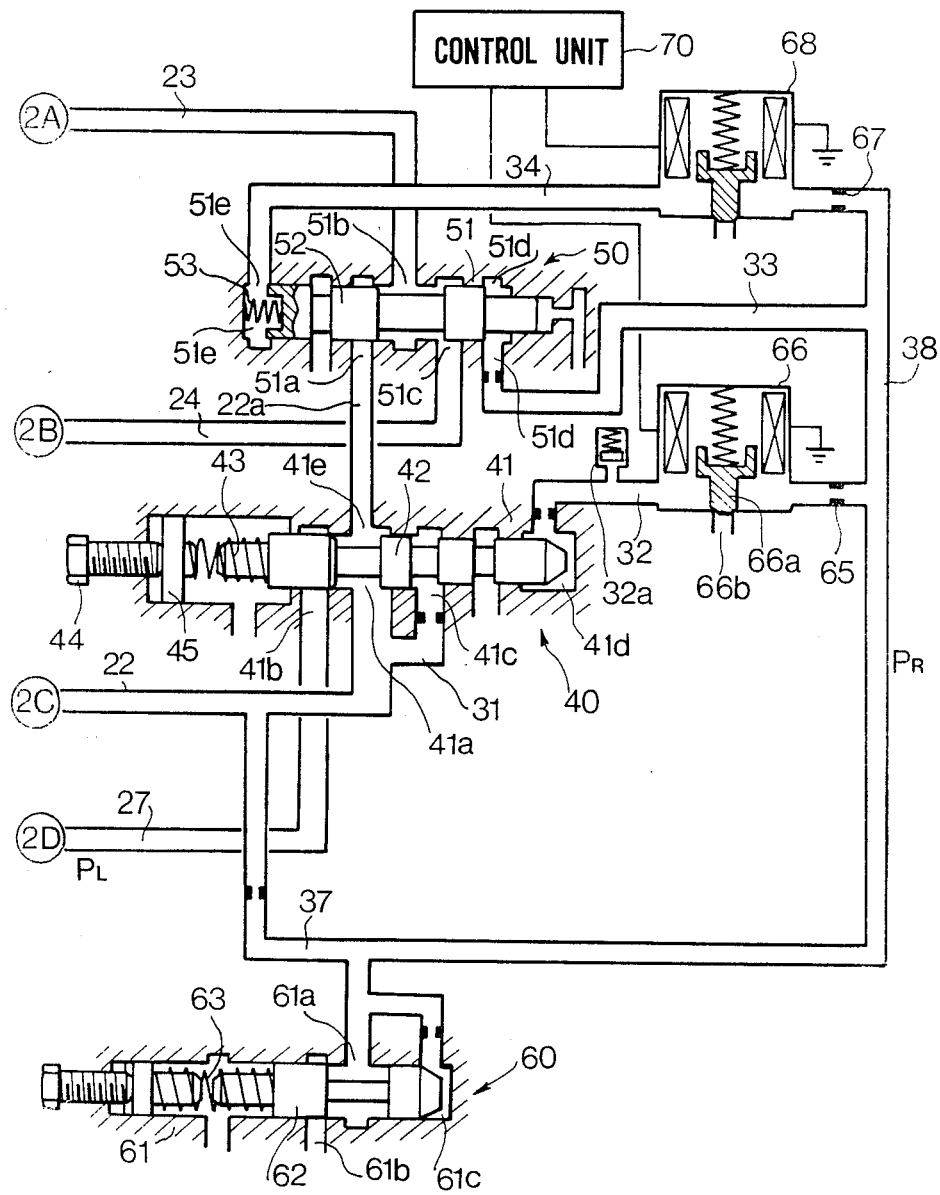

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and a conduit 23. The chamber 10 of driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. The Port 51b communicates with the chamber 9 through conduit 23, and the port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, inlet port 61a connected to the pump 21 through passages 37, 22, spool 62, end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The solenoid operated control on-off valves 66 and 68 are operated by signals from a control unit 70. Thus, pressure controlled by the control valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 increases with decreasing duty ratio. The spool 52 is shifted to an oil drain position by decreasing the duty ratio. It will be understood that when the oil is supplied to the chamber 9, the transmission is upshifted.

Figure 3A:
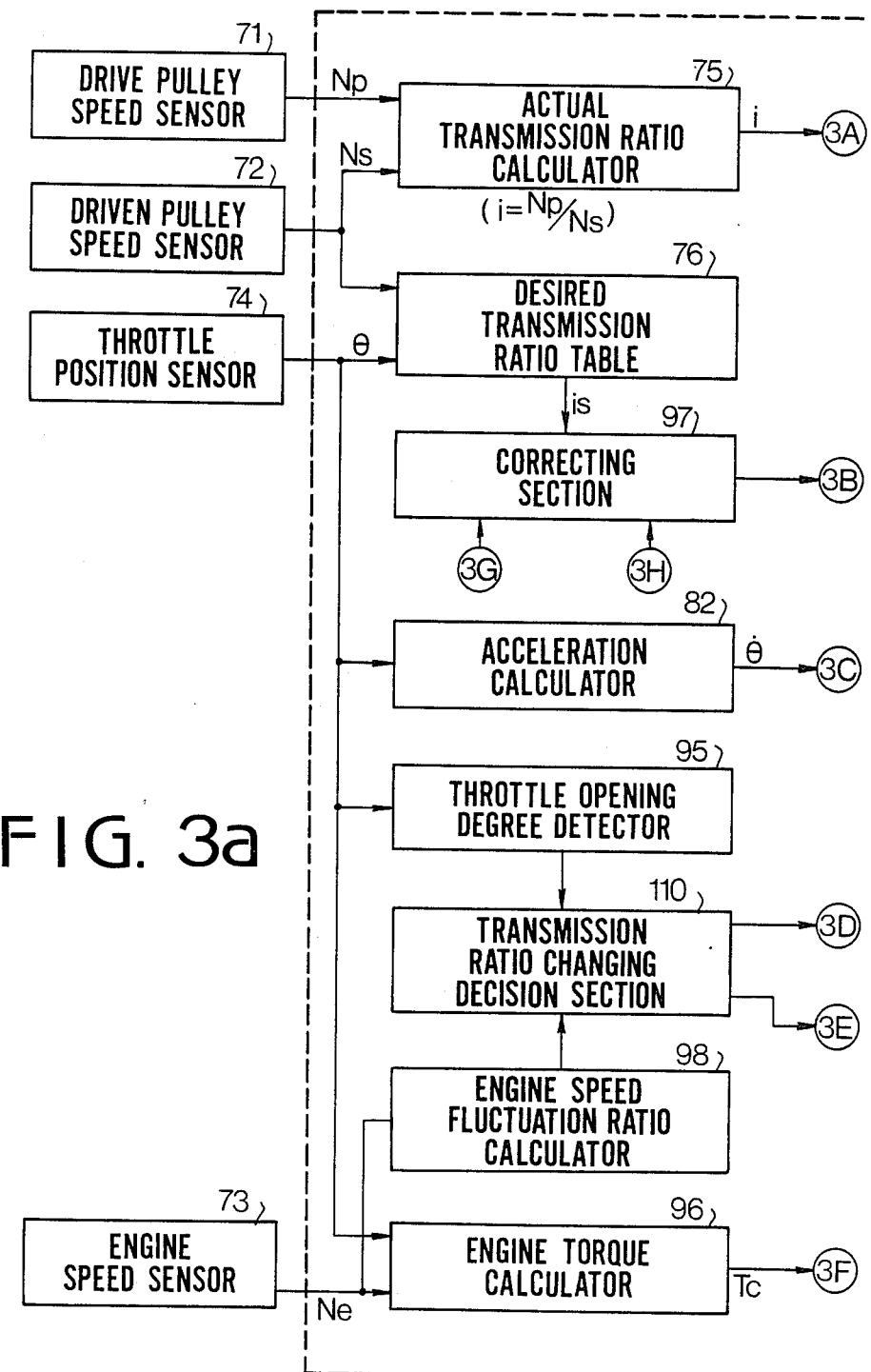
FIGS. 3a and 3b are block diagrams showing a control unit.
Figure 3B:
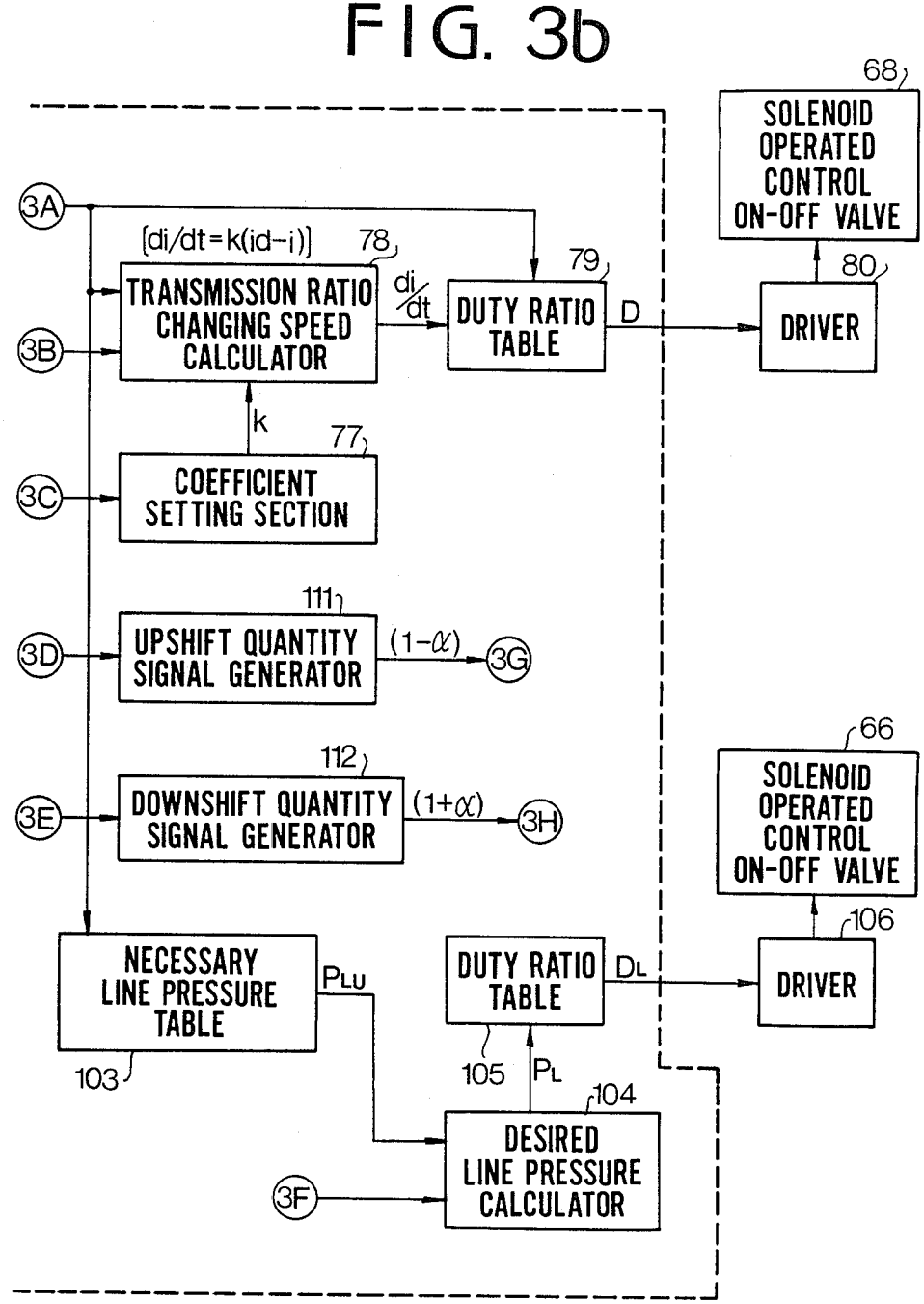

Referring to FIGS. 3a and 3b, a drive pulley speed sensor 71, driven pulley speed sensor 72, engine speed sensor 73 and throttle position sensor 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle position sensor 74 are fed to a desired transmission ratio table 76. The desired transmission ratio is fetched from the table 76 in accordance with the signals $N_s$ and $\theta$. On the other hand, the output signal $\theta$ is fed to an acceleration calculator 82 to obtain acceleration $\dot{\theta}$. The signal of the acceleration $\dot{\theta}$ is supplied to a coefficient setting section 77 to produce a coefficient K. The output of the desired transmission ratio table 76 is corrected at a correcting section 97 to provide a corrected desired transmission ratio id as described hereinafter. The actual transmission ratio i, corrected desired transmission ratio id and coefficient K from the coefficient setting section 77 are applied to a transmission ratio changing speed calculator 78 to produce a transmission ratio changing speed $di/dt$ from the formula $di/dt = K(id - i)$. When the value of $di/dt$ is positive, the transmission must be downshifted and when the value is negative, upshifting must be done.

The speed $di/dt$ and actual ratio i are applied to a duty ratio table 79 to derive a duty ratio D. The duty ratio D is supplied to the solenoid operated on-off valve 68 through a driver 80. The duty ratio table 79 stores a plurality of duty ratios with respect to the middle ratio (50%). When $di/dt$ is positive, a duty ratio smaller than 50% is derived to downshift, and when negative, a duty ratio larger than 50% is fetched to upshift.

On the other hand, the output signal $\theta$ of throttle position sensor 74 and output $N_e$ of engine speed sensor 73 are fed to an engine torque calculator 96.

The actual transmission ratio i from the calculator 75 is applied to a necessary line pressure table 103 to derive a necessary line pressure $P_{LU}$ per unit torque. The necessary line pressure $P_{LU}$ and the engine torque signal $T_C$ from the calculator 96 are applied to a desired line pressure calculator 104 which calculates a desired line pressure $P_L$ which is slightly higher than a line pressure for transmitting the engine torque. The desired line pressure $P_L$ is expressed as follows:

$$P_L = P_{LU} \times T_C$$

The desired line pressure $P_L$ is applied to a duty ratio table 105 to derive a duty ratio $D_L$ corresponding to the line pressure $P_L$. The duty ratio $D_L$ is supplied to a driver 106 which operates the solenoid operated on-off valve 66 at the duty ratio.

In accordance with the present invention, the output signal $\theta$ of the throttle position sensor 74 is applied to a throttle opening degree detector 95 and the output signal $N_e$ of the engine speed sensor 73 is applied to an engine speed fluctuation ratio calculator 98. The detector 95 produces an output signal (closed throttle signal) when the throttle valve is in the idle (closed) position. The calculator 98 calculates the difference ($\Delta N_e$) between a maximum engine speed and a minimum engine speed in a predetermined period (for example, several revolutions of the crankshaft of the engine) and calculates a ratio (F) of the difference to an average engine speed ($\Delta N_e/N_e A$).

The output signals of the detector 95 and calculator 98 are applied to a transmission ratio changing decision section 110 for determining whether the transmission ratio should be changed. The decision section 110 responds to the output signal of the detector 95 and decides whether the ratio ($F = \Delta N_e/N_e A$) is larger than a predetermined ratio Fi. The ratio Fi is determined to be to such a value that if the transmission ratio is upshifted from the ratio at that time under such a fluctuation ratio (Fi), the engine does not stall and vibration of the vehicle does not occur. When the ratio F is smaller than the ratio Fi, the decision section 110 produces an upshift signal, and produces a downshift signal when the ratio F is larger than ratio Fi. The upshift signal is fed to an upshift quantity signal generator 111 to produce an upshift quantity signal $(1-\alpha)$. The value $\alpha$ is selected to provide a proper upshift quantity. The downshift signal is supplied to a downshift quantity signal generator 112 which produces a downshift quantity signal $(1+\alpha)$. Both the signals are fed to the correcting section 97 where correcting calculations of is $(1\pm\alpha)$ are performed. The transmission ratio can not be set to a value smaller than a minimum ratio (imin) of the transmission. Accordingly, when the value of is $(1-\alpha)$ is smaller than the minimum ratio (imin), the ratio of id $(1-\alpha)$ is not used and the transmission ratio is set to the minimum ratio.

In operation, while the vehicle is at a stop, the chamber 10 of the driven pulley 8 is supplied with line pressure through passage 22b, and the chamber 9 of the drive pulley 7 is drained, since the $N_p$, $N_s$, $\theta$ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles 18 of the driving wheels 19. Thus, the vehicle is started.

At that time the line pressure is at the highest value by the line pressure control valve 40, since the duty ratio for the solenoid operated on-off valve 66 is large, and the spool 42 of the line pressure control valve 40 is at the right end position. When the throttle valve is opened for acceleration, the actual transmission ratio i and transmission ratio changing speed di/dt are calculated by calculators 75, 78, and duty ratio D is obtained from the table 79. The value of the duty ratio D is larger than the neutral value, so that the pressure in the chamber 51d of the transmission ratio control valve 50 is higher than the chamber 51e. Thus, the spool 52 is shifted to the left to communicate the port 51a with the port 51b, so that oil is supplied to the chamber 9 through the conduit 23. On the other hand, the duty ratio for the control valve 66 is reduced, thereby shifting the spool 42 of the line pressure control valve 40 to the left. The port 41a communicates with the port 41b of the drain passage 27. Thus, the line pressure reduces, and the transmission is upshifted, since oil is still supplied to the chamber 9 through the transmission ratio control valve 50. The downshift operation is performed in the reverse manner.

Figure 4:
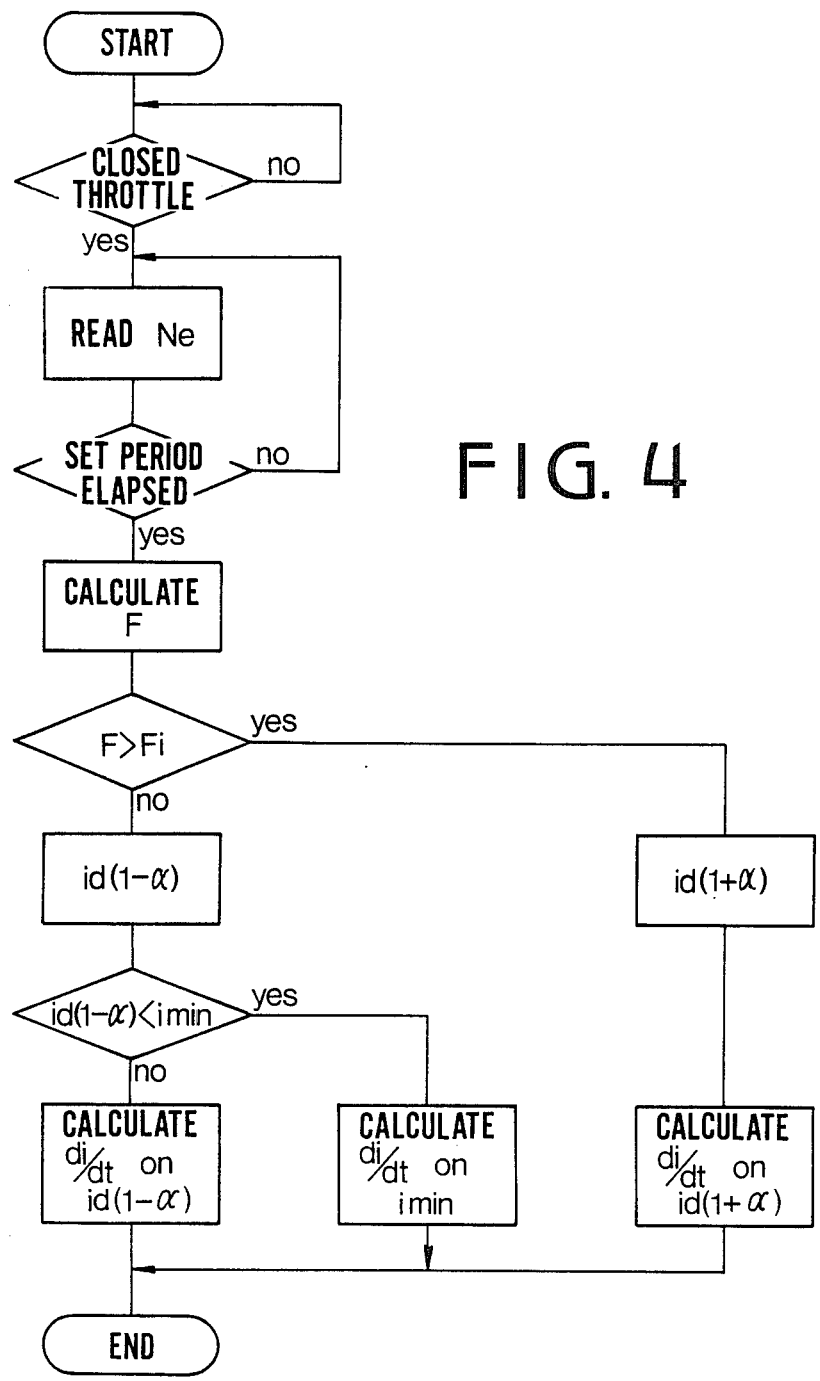
FIG. 4 is a flowchart showing the operation of the control system.

The operation during the deceleration at the closed throttle is described with reference to FIGS. 3a, 3b and 4. First, it is decided whether the throttle valve is closed. When the throttle valve is closed, the fluctuation ratio F in the predetermined period is calculated by the calculator 98. The fluctuation ratio F is compared with the predetermined ratio Fi at the decision section 110 to generate the upshift signal or downshift signal. Upon the upshift signal, upshift quantity $(1-\alpha)$ is applied to the correcting section 97, so that the desired transmission ratio id is corrected by the calculation of is $(1-\alpha)$. Based on the corrected desired transmission ratio id$(1-\alpha)$ is $(1-X)$, the transmission ratio changing speed di/dt is calculated by the calculator 78 and the corresponding duty ratio D is derived from the table 79. Thus, the on-off valve 68 is operated to upshift the transmission, so that the engine speed is reduced at a speed decided by the upshifted transmission ratio.

Figure 5:
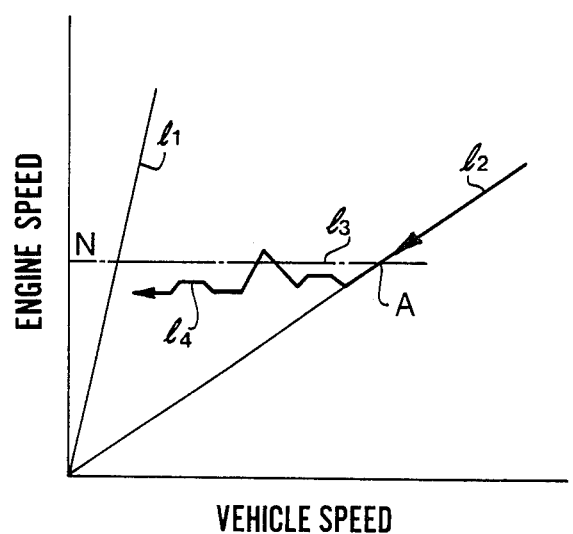
FIG. 5 is a graph showing the relationship between engine speed and vehicle speed.

On the contrary, at the downshift signal, the desired transmission ratio is corrected to be downshifted by the calculation of is $(1+\alpha)$. Thus, the transmission is downshifted to increase the engine speed. A line $l_4$ of FIG. 5 shows the variation of the engine speed.

Although the value of $\alpha$ is constant in the above described embodiment, the value of $\alpha$ can be changed in accordance with the vehicle speed. Further, when the engine speed is increased, the value of $\alpha$ is set to a large value in order to quickly recover the engine speed fluctuating condition, and when the engine speed is reduced, the value $\alpha$ is set to a low value.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a first hydraulic circuit having a pump for supplying oil to the first cylinder, through the transmission ratio control valve and to the second cylinder, the system comprising:

- first means for detecting operating conditions of said engine and for producing a first signal;
- second means responsive to the first signal for shifting the spool of the transmission ratio control valve so as to change the transmission ratio;
- third means for detecting closing of a throttle valve of the engine and for producing a closed throttle signal;
- fourth means responsive to the closed throttle signal for producing an upshift signal when a value of fluctuation of engine speed at closing of the throttle valve is smaller than a predetermined value for a predetermined time;
- fifth means responsive to the upshift signal for causing the second means to shift the spool of the transmission ratio control valve in upshift direction to upshift the transmission ratio.

2. The control system according to claim 1 wherein the second means includes a second hydraulic circuit for supplying the oil to the transmission ratio control valve so as to shift the spool, and control valve means provided in the second hydraulic circuit for controlling the amount of the oil supplied to the transmission ratio control valve.

3. The control system according to claim 2 wherein the control valve means is a solenoid operated on-off valve.

4. The control system according to claim 2 wherein the second hydraulic circuit is provided with a regulator valve for maintaining the pressure of oil at a constant value.

5. The control system according to claim 3 wherein the second means includes means for producing a desired transmission ratio signal, and means responsive to the desired transmission ratio signal for producing a duty ratio signal for operating the control valve means.

6. The control system according to claim 1 wherein the predetermined value is such a value that the engine does not stall if the transmission is upshifted.

7. In a control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, the control system having a transmission ratio control valve having ports and a shiftable spool, and a first hydraulic circuit having a pump for supplying oil to the first hydraulic cylinder through the transmission ratio control valve and to the second hydraulic cylinder, the improvement in the system comprising:

- first means for shifting the spool of the transmission ratio control valve so as to change the transmission ratio;
- second means for detecting closing of a throttle valve of the engine;
- third means responsive to the second means when the throttle valve is closed for producing an upshift signal when a value of fluctuation of engine speed is smaller than a predetermined value for a predetermined time;
- fourth means responsive to the upshift signal for causing the first means to shift the spool of the transmission ratio control valve in upshift direction to upshift the transmission ratio.

8. The control system according to claim 7, wherein said fourth means produces said upshift signal when the difference between maximum and minimum engine speed in said predetermined time divided by average engine speed is less than said predetermined value.

9. The control system according to claim 8, wherein said predetermined time is equal to the time of several revolutions of the engine.

10. The control system according to claim 8, wherein the predetermined value is such a value that the engine does not stall if the transmission is upshifted when the difference between maximum and minimum engine speed in said predetermined time divided by average engine speed is less than said predetermined value.

11. The control system according to claim 7, wherein said fourth means produces an upshift quantity for reducing the transmission ratio.

12. The control system according to claim 11, wherein said upshift quantity is constant.

13. The control system according to claim 11, wherein said upshift quantity is a function of vehicle speed.

14. The control system according to claim 11, wherein said upshift quantity is set to a large value when the engine speed is increased, whereby an engine speed fluctuation condition is quickly recovered.

15. The control system according to claim 11, wherein said upshift quantity is set to a low value when the engine speed is reduced.

16. The control system according to claim 11, further comprising
means for producing a desired transmission ratio,
said first means is responsive to said desired transmission ratio for the shifting of said spool, and
said fourth means corrects the desired transmission ratio by subtracting from said desired transmission ratio the product of the desired transmission ratio times said upshift quantity.

17. The control system according to claim 7, wherein said fourth means produces an upshift quantity for reducing the transmission ratio but not less than a minimum transmission ratio.

18. The control system according to claim 7, further comprising
means for causing said first means to downshift the transmission when the value of the fluctuation of the engine speed when the throttle valve is closed is larger than said predetermined value for said predetermined time.

* * * * *